United States Patent [19]

Ashauer et al.

[11] 4,077,680

[45] Mar. 7, 1978

[54] SHAFT MOUNTING APPARATUS

[75] Inventors: Karl Ashauer, Wolfsburg; Klaus Sendzik, Lehre, both of Germany

[73] Assignee: Volkswagenwerk Aktiengesellschaft, Germany

[21] Appl. No.: 732,460

[22] Filed: Oct. 14, 1976

[30] Foreign Application Priority Data

Dec. 11, 1975 Germany ............................ 2555644

[51] Int. Cl.$^2$ ............................................ F16C 25/00
[52] U.S. Cl. ........................................ 308/70; 308/26
[58] Field of Search ...................... 308/26, 36, 70, 71

[56] References Cited

U.S. PATENT DOCUMENTS

| 2,819,099 | 1/1958 | Rittle | 308/70 |
| 3,503,820 | 3/1970 | Galbato | 308/70 |
| 3,774,879 | 11/1973 | Zink | 308/70 |
| 3,829,184 | 8/1974 | Chevret | 308/26 |

FOREIGN PATENT DOCUMENTS

| 1,160,310 | 7/1964 | Germany. | |
| 1,187,500 | 9/1959 | Germany | 308/26 |

Primary Examiner—Richard A. Bertsch
Attorney, Agent, or Firm—Brumbaugh, Graves, Donohue & Raymond

[57] ABSTRACT

A shaft mounting apparatus includes, in a preferred embodiment, in addition to a bearing, a ring mounted between the shaft and a conical support surface which is concentric to the shaft. The ring has a conical surface configured to cooperate with the conical support surface and resilient means apply an axial force to the ring to maintain the two conical surfaces in engagement. The ring thereby adds additional stiffening to the shaft thus shifting the resonant frequency of the shaft to a frequency above the frequency range at which the shaft is excited during operation.

5 Claims, 2 Drawing Figures

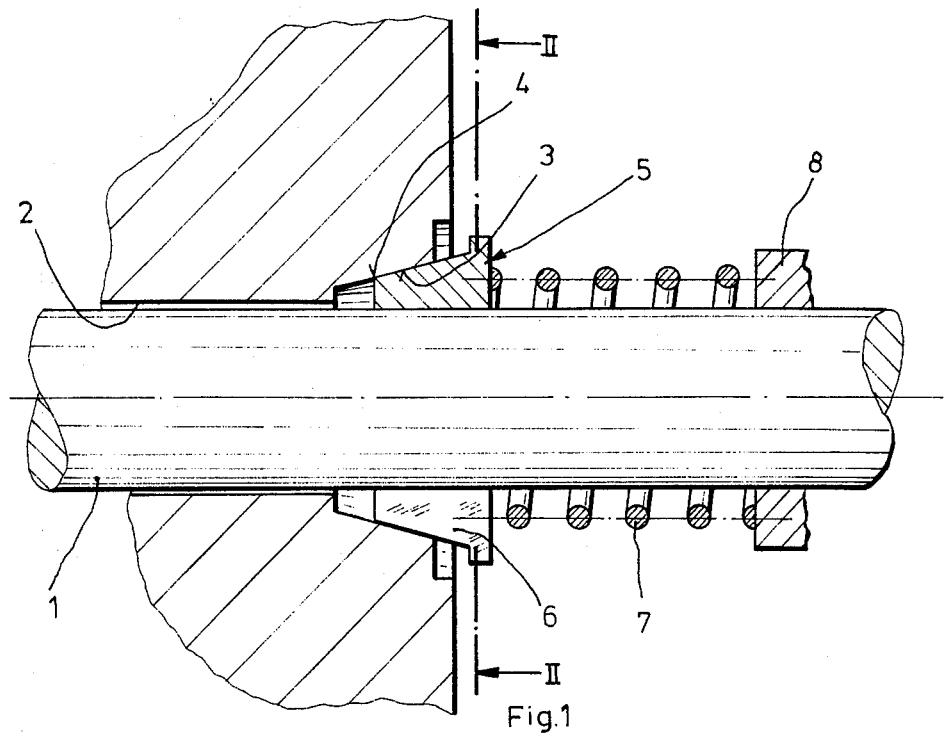
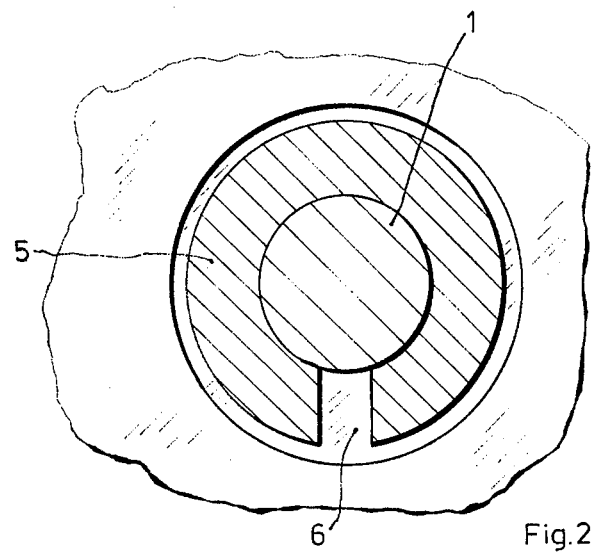

SHAFT MOUNTING APPARATUS

BACKGROUND OF THE INVENTION

This invention relates to shaft mounting devices and in particular to devices for inhibiting resonant oscillations of a rotatable shaft.

A shaft which extends or projects outward from its mounting bearing, or extends over a considerable distance between bearings has a natural resonant vibrational frequency which depends primarily on the length, mass and stiffness of the shaft in addition to the flexibility of the bearings in which the shaft is mounted. The tendency of a shaft to enter into resonant vibrations is enhanced when the shaft bearings have bearing play; that is, the shaft may be radially vibrated with respect to the structure to which it is mounted by the bearing. When a shaft is excited to vibrate at a frequency which is at or near its natural vibrational frequency, or harmonics of its natural vibrational frequency, the amplitude of shaft vibration will be significantly increased causing unwanted operational noise and in severe cases damage to the bearings.

One prior art technique for suppressing vibrations in a shaft is disclosed in published German patent application No. 1,187,500. That application discloses vibration suppressing intermediate bearings in a curved drive shaft. The curvature of the drive shaft causes a shifting in the first mode resonant frequency of the drive shaft to a range higher than the anticipated revolution frequency of the shaft. Intermediate bearings are provided in the drive shaft, at the point of maximum amplitude of vibration, to suppress vibrations of the shaft in the second mode. The arrangement illustrated in the published application, while effective for the purpose disclosed, is not suitable for suppressing vibrations in an extended shaft, since the diametrically opposed rubber plugs suppress vibrations in only two radial directions.

A similar arrangement, wherein a bearing is mounted by resilient means is disclosed in German patent 1,160,310. The patent shows a bearing which is completely supported by resilient elements. Such a mounting while reducing the transmission of shaft vibrations to the structure on which the shaft is mounted does not alter the natural frequency of resonance of the shaft to reduce the amplitude of vibrations and consequently eliminate the source of vibrational noise and the possibility of excess bearing wear on account of shaft vibration. Also the structure disclosed does not effect the vibrational freedom resulting from bearing play.

Shaft mounting apparatus which overcomes these disadvantages is disclosed in the U.S. patent application Ser. No. 659,114 filed February 18, 1976 of Ulrich Sorgatz and Hans-Jurgen Kogge and assigned to the same assignee as this application. That apparatus includes at least one bearing between the structure and the extended shaft which has bearing play. Also included is a support collar on the structure having an interior surface which is concentric to the shaft. Finally, there is provided a device, permanently resilient in all radial directions, mounted between the shaft and the surface, for shifting the resonant frequency of the shaft to a frequency above the frequency range at which the shaft is excited during operation. As is stated in detail in the aforementioned patent application, the shaft mounting apparatus thus includes one or more bearings having conventional form and a device which centers itself because of its permanent elasticity in all radial directions. Such apparatus is capable of withstanding long periods of operation as may occur, for example, in motor vehicles. The elasticity of the self-centering device is selected in such a way that, by providing additional stiffness to a system which has a tendency to oscillate, the natural frequency of the shaft is moved up to a non-critical frequency range.

It is therefore an object of the present invention to provide shaft mounting apparatus which suppresses shaft vibrations.

It is a further object of the present invention to provide such mounting apparatus which is economically constructed and easily assembled.

It is a further, more particular object of the present invention to provide such mounting apparatus of the type disclosed in the aforementioned patent application which is highly effective and durable despite its simple construction.

SUMMARY OF THE INVENTION

In accordance with the present invention there is provided an apparatus for mounting an extended shaft to a support structure, wherein the shaft is subjected to a selected range of exitation frequencies and has a natural resonant vibrational frequency. The apparatus includes at least one bearing between the structure and the extended shaft which has bearing play. Also included is a support surface on the structure which is concentric to the shaft and a ring mounted between the shaft and the support surface for shifting the resonant frequency of the shaft to a frequency above the selected frequency range. The ring and the support surface are provided with cooperating conical surfaces that are kept engaged by an axial force applied to the ring by at least one axial spring. The radial elasticity of the ring, which may be made of brass or bronze, and the prestress of the cooperating parts are thus both derived from the axial spring, with the changing of the direction of the force from the axial to the radial direction being effected by the cooperating conical surfaces.

For a better understanding of the present invention together with other and further objects thereof, reference is had to the following description, taken in conjunction with the accompanying drawing and its scope will be pointed out in the appended claims.

BRIEF DESCRIPTION OF THE DRAWING

FIG. 1 is a cross-sectional radial view of a shaft mounting apparatus in accordance with the present invention.

FIG. 2 is a cross-sectional axial view of the shaft mounting apparatus illustrated in FIG. 1.

DESCRIPTION OF THE PREFERRED EMBODIMENT

FIGS. 1 and 2 show respectively a longitudinal and a transverse cross-section of a shaft mounting apparatus in accordance with the present invention. In the illustrated embodiment an extended shaft 1 is supported by means of a bearing surface 2 in known manner with a certain amount of play. The bearing surface 2 surrounding the shaft 1 is the component of a wall which further comprises a conical surface 3. The surface 3 cooperates together with a counter-conical surface 4 of a ring 5 which is axially slidable on the shaft 1 and provided with a slot indicated at 6. An axial spring, which in this embodiment is a helical spring 7 and is supported at its (in the figure) right end by a stop means 8 on the shaft 1, forces the ring 5 to the left so that the conical surfaces 3 and 4 are maintained in engagement with each other. The spring prestress, the size and taper of the conical surfaces and the ring dimensions are selected in such a way that the natural frequency of the shaft is shifted to a frequency that lies above the frequency range at which the shaft is excited during operation.

The ring is constructed sufficiently thin to enable it to resiliently compress together under the force of the spring 7.

As described also in connection with the invention disclosed in the aforementioned patent application Ser. No. 659,114, the present invention limits in a defined manner the radial degree of freedom of the shaft 1 that is permitted by the bearing play. The arrangement according to the present invention consisting of parts 5, 7 and 8 and the conical surface 3 of the wall structure thus effectively neutralize the bearing play by a permanent elasticity or stiffness that is present in all radial directions.

Instead of the helical spring 7, cup springs may also be employed to apply an axial force to the ring 5.

While there have been described what are believed to be the preferred embodiments of the invention, those skilled in the art will recognize that other and further modifications made be had thereto without departing from the true spirit of the invention, and it is intended to claim all such embodiments as fall within the true scope of the invention.

We claim:

1. In apparatus for mounting an extended shaft to a support structure, said shaft being subjected to a selected range of excitation frequencies and having a natural resonant vibrational frequency, said apparatus comprising at least one bearing supporting said shaft arranged between said structure and said shaft, and having bearing play; a internal support surface on said structure concentric to said shaft; and means, permanently resilient in all radial directions, mounted between said shaft and said support surface, for shifting the resonant frequency of said shaft to a frequency above said frequency range, the improvement wherein said support surface is conical and said frequency shifting means includes:
   a ring arranged concentric to said shaft and having a conical surface configured to cooperate with said conical support surface, and
   resilient means for applying an axial force to said ring to maintain the conical surface thereof in engagement with said conical support surface.

2. The apparatus defined in claim 1, wherein said ring is slidably supported on said shaft and said resilient means includes a spring disposed coaxially to said shaft between said ring and a stop means on said shaft.

3. The apparatus defined in claim 2, wherein said spring is a helical spring.

4. The apparatus defined in claim 2, wherein said stop means is rigidly connected to said shaft.

5. The apparatus defined in claim 1, wherein said ring is slotted.

* * * * *